Feb. 27, 1951 M. DEN HERTOG 2,543,003

SELECTION CONTROL FOR TELEPHONE SYSTEMS

Filed Aug. 17, 1946 2 Sheets-Sheet 1

INVENTOR.
MARTINUS DEN HERTOG
BY
Robert Harding Jr.
ATTORNEY

Feb. 27, 1951 M. DEN HERTOG 2,543,003

SELECTION CONTROL FOR TELEPHONE SYSTEMS

Filed Aug. 17, 1946 2 Sheets-Sheet 2

INVENTOR:
MARTINUS DEN HERTOG
BY
Robert Harding Jr.
ATTORNEY

Patented Feb. 27, 1951

2,543,003

UNITED STATES PATENT OFFICE 2,543,003

SELECTION CONTROL FOR TELEPHONE SYSTEMS

Martinus den Hertog, Antwerp, Belgium, assignor to International Standard Electric Corporation, New York, N. Y., a corporation of Delaware Application August 17, 1946, Serial No. 691,285
In the Netherlands April 8, 1943

Section 1, Public Law 690, August 8, 1946
Patent expires April 8, 1963

12 Claims. (Cl. 179—18)

This invention relates to new and useful improvements in automatic telecommunication systems, and more particularly to the setting of a number of selector switches, finders or the like under the control of a common marking device.

It is known to set single motion selector switches via a marking multiple common for several selector switches and from which a common control circuit extends to the switches. However, only one of the switches can be controlled by such marking systems at a time and while the control circuit is used by this one switch the other switches must remain idle. Furthermore, whenever the common control circuit becomes defective, all the selector switches which are served by it are thrown out of service. This is a serious objection, particularly where the selectors are used in comparatively small groups, e. g. final selectors, where the disabling of a substantial part of the group by a faulty common control circuit considerably reduces the traffic handling capacity of the group.

It has been suggested to remedy these defects by providing two or more common control circuits for a group of selector switches served by the same marking multiple. Although this permits each one of several selectors to engage a control circuit on which a selective digit may be received, only one of the control circuits can make use of the marking multiple at a time. If several control circuits are engaged at the same time, they can control the setting of the respective selector switches only one after another. Furthermore, if some fault develops in one of the control circuits or in the selector circuit to which it is temporarily connected, then the setting of the selector switch cannot be completed, the marking multiple will be kept engaged by this control circuit for an undue length of time, and the calls handled by other control circuits of the group will not be completed. By such a faulty condition not only one control circuit, but all control circuits and all selector circuits served by them will be thrown out of service.

The object of the present invention is to provide means by which a common marking multiple may be employed simultaneously by a plurality of control circuits for the setting of the selector or finder switches temporarily connected to them. The number of switches for which a marking multiple may be provided in common may thus be greatly increased, and a relatively large number of control circuits may be provided in common for them. This will reduce the cost of the installation and increase the safety of operation.

As well known, a selector attached to such common circuit may be caused to hunt for a marking potential taken from one pole, e. g. the grounded pole, of battery, and another selector which is attached to another circuit may be caused to hunt for a potential taken from the other pole of the battery. For example, Swiss Patent No. 198,279 issued July 15, 1938 describes an arrangement in which a condenser is provided for each control circuit and used as a source individual to that control circuit for the purpose of operating an associated test relay via the common marking multiple. The inherent defect of such arrangements is that if two or more switches are simultaneously set via the marking multiple the so called "crossed" connections may occur, because when the selector switch controlled by a first control circuit arrives in a position marked by the second control circuit, simultaneously with the arrival of a second selector switch in a position which is marked by the first control circuit, then a circuit will be established in which the two sources and the two test relays of both control circuits will be connected in series, and both relays will operate to stop their selectors in wrong positions. The reason for this is that the test relay is energized in a closed loop circuit directly via the marking multiple, whereby a closed loop can be established via two test circuits through the marking multiple in series.

In the Swiss patent referred to, it was proposed to remedy this by permitting the selectors always to start their hunting movement from a predetermined position.

According to one feature of the present invention, "crossed" connections are made impossible, because the closure of a loop circuit through the marking multiple, or of two of such loop circuits in series, will not in itself cause a test relay to operate.

According to another feature of the invention, a marking multiple is provided in common for a plurality of switches and each of a plurality of control circuits marks the position for the switch with which it is temporarily connected by making use of one of a plurality of distinct sources. These sources may be distinguished in at least one of their electrical properties (potential, phase, frequency), and each control circuit connects preferably the same characteristic reference source to a discriminator which is associated with it. The discriminator will compare this source with any source which may be connected to the discriminator over the marking multiple by the test brush of a hunting switch. The test relay or other means for stopping the switch will operate only when the test brush finds in a particular position a marking source which is recognized by the discriminator as bearing a predetermined relationship to the source connected by the control circuit to the discriminator. The relationship may be that the two sources have the same electrical characteristics.

Such common marking multiples may be used also in connection with several groups of call finders, one of which must find a calling line circuit, or for other types of switching.

It is known e. g. from Swiss Patent No. 191,973 issued July 15, 1937 to den Hertog, to arrange in telecommunication systems incoming line circuits, e. g. toll line circuits, in such a manner, that they can selectively engage a free outgoing line circuit in a selected group by means of backward hunting call finders. In the arrangement described in this patent, the incoming line circuits may be switched to outgoing line circuits via one or more stages of call finders. The incoming line circuits are multipled in the banks of several groups of finders, each of which corresponds with a direction of outgoing lines or of a combination of, e. g. two directions, whereas the outgoing line circuits themselves are each associated with a call finder. The multipling of the incoming line circuits over the different groups of call finders giving access to the different directions, is not complete. Only the talking wires and one or two wires which serve for signaling when an incoming and an outgoing line circuit are connected are completely multipled. The test multiple of the call finders is, however, segregated for each group corresponding to a direction or combination of directions, and each incoming line circuit may, under the control of the selected digit received in it, selectively connect a test potential in the test multiple of one of these groups of finders. Thus only the call finders which correspond to the selected direction may find the test potential supplied from an incoming line circuit, whereas other finders in different groups cannot find this potential, even if they should be hunting for other calls. Only a finder in the selected group can, therefore, attach itself to a calling incoming line circuit.

It is necessary in previously mentioned Swiss Patent No. 191,973 to den Hertog, to provide from each of the incoming line circuits as many test leads as there are different groups of line finders to which these line circuits have access.

The practical objection to this is that much cabling is required for the test multiples and special cross-connecting facilities must be provided between the incoming line circuits and the different test multiples of the line finder groups. For instance, if 100 incoming line circuits have access to 18 groups of call finders, then 18 wires must be connected each to a different test multiple, which are of course distributed over different finder bays. This makes it necessary to provide a cross-connection between the incoming line circuits and the test multiples, because straight cabling would be impracticable. Obviously, this wiring does not include the conversational and signaling wires, which for each of the incoming line circuits may be multipled straight over all the different groups of line finders to which they have access.

The last-mentioned arrangement may be considerably improved according to the present invention by providing a common test multiple for all the different finder groups. In the above-mentioned example only one test wire need be provided for each incoming line circuit and multipled indiscriminately over the finders of all 18 directions. This test wire may, of course, be in the same cable as the conversational and signaling wires which are multipled over all the groups, and thus a great saving effected.

This is made possible because according to the present invention a single test multiple may be used for controlling the setting of several switches simultaneously, in such a manner that each of the hunting switches searches for a particular marking potential which is connected to one of the test contacts without regard to the other marking potentials, which may simultaneously be connected to the marking multiple for the purpose of setting other hunting switches.

Two embodiments of the invention are illustrated in the drawings, in which.

Figure 1:
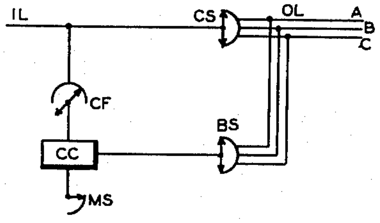
Figs. 1 and 2 represent diagrammatically a common marking multiple connected to selector switches and to backwards hunting call finders, respectively.

Referring now to Fig. 1, a common marking multiple for single-motion selector switches may be employed by providing a number of incoming junctions IL and associated selectors CS with a plurality of common control circuits CC. Each common control circuit CC is provided with a finder CF, by means of which a free control circuit may temporarily connect itself to an incoming junction IL on which a call has arrived. Each circuit CC has also a marker switch MS on which the digit is received which controls the setting of the selector switch, and a marking multiple selector BS.

The setting of the selector BS may be accomplished in accordance with any known system of selection. BS may for instance be a two-motion selector having separate selecting and hunting movements, whereby the marker switch MS may be eliminated and the impulses received directly on the selector BS. BS may be a single-motion selector and set, e. g. by direct current marking, under the control of the marker switch MS. Alternatively, the selector BS may be set by means of discriminating signals, making use of different sources of alternating current in the manner described by U. S. application of Jacob Kruithof et al., Serial No. 473,278, filed January 22, 1943, now Patent No. 2,452,578 dated November 2, 1948. In the particular embodiment of the invention illustrated in Figs. 1 and 2, BS is a single-motion selector and set by direct current marking under the control of the marker MS.

The outgoing junctions OL are multipled over all selectors CS and are also accessible to the selectors BS forming part of the control circuits.

After a control circuit CC has been connected to an incoming junction, the numerical digit is received on the marker switch MS which controls the selector BS to select, in a manner well known in the art, a free outlet OL in the selected group. The selected outlet OL is rendered busy for further calls by the control circuit CC which directs the switch CS to this outlet. After the selector CS has been set on the terminals corresponding to this outlet, the outgoing junction OL is held by the selector CS and the control circuit CC is released.

Figure 3:
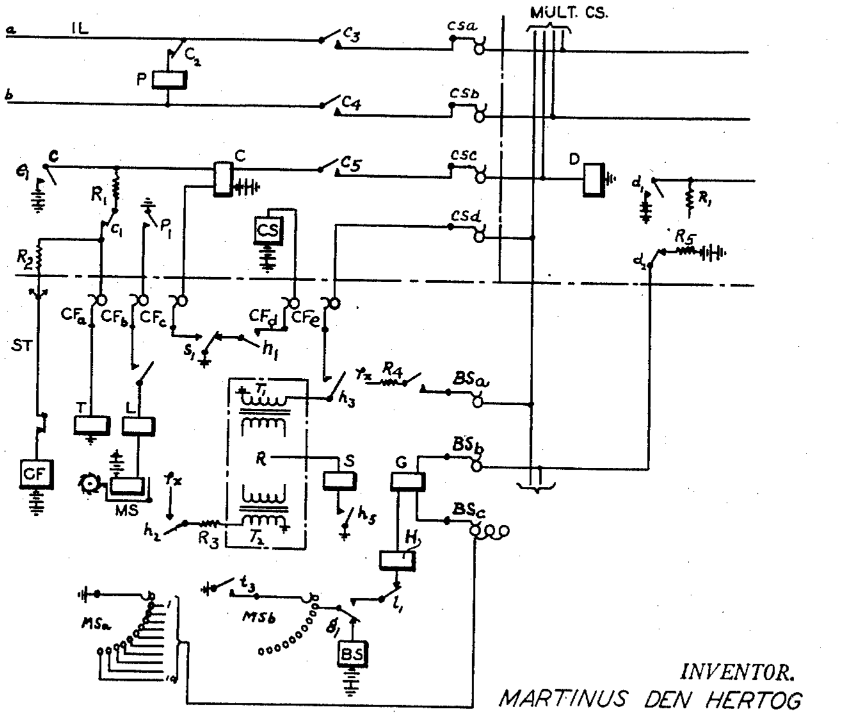
Figs. 3 and 4 are simplified circuit diagrams of the arrangements indicated by Figs. 1 and 2, respectively.

The significant details of the circuit operation to illustrate the invention shown in Fig. 1 are represented in Fig. 3 which operates as follows:

When a call comes in on a junction IL, battery is placed, e. g. by a contact $e_1$, on the incoming c wire. This applies a test potential to test multiple of the finder CF, via resistance $R_1$ and break contact $c_1$, and at the same time energizes in parallel a starting circuit St, via resistance $R_2$. The starting circuit starts in a known way all free finders CF and one of these finders hunts in a known way for the test potential applied by the calling incoming junction IL. To simplify matters this part of the circuit has not been completely shown and it is assumed that the result of the testing is that relay T is operated in the control circuit, via the test brush CFa. It is further assumed that in some manner not indicated on the drawing, a signal is sent that a control circuit has been attached and is ready for the selective digit, whereupon impulses are sent over the incoming junction IL to operate the stepping relay P. For each impulse received, a ground is connected from contact $P_1$, via brush CFb, and contact $t_1$ to relay L and the power magnet of marker switch MS. L remains operated during the train of impulses received, and MS makes a step for each impulse in the known way. Also in a known way, as soon as the marker switch is off-normal, the selector switch BS is started to hunt for the marking potential applied by the marking brush of switch MS to the marking multiple c of selector BS. For this purpose a circuit is closed for the power magnet of selector BS as soon as the marker switch is out of normal from ground at make contact $t_3$, brush MSb and break contact $g_1$. When the selector BS reaches a free outgoing junction marked in the group by the marker switch MS, the test relay G energizes in the following circuit:

Ground via brush MSa and marking multiple of MSa and BSc, winding of G, brush BSb, break contact $d_2$ in the outgoing junction, resistance $R_5$ to battery. By the operation of relay G the switch BS is stopped, but only upon the release of L, i. e. when the complete digit has been received. A parallel circuit is then closed via the make contact of contact $g_1$, through the low resistance windings of relays H and G, by which the test potential supplied at the outgoing junction OL through resistance $R_5$ is rendered busy. Relay H operates and closes the necessary circuits to set the switch CS via the common marking multiple in the position indicated by the switch BS. This happens as follows:

Each control circuit has a discriminating device R which may be of the kind as described in the U. S. application of S. Simon, Serial No. 472,623, filed January 16, 1943, now Patent No. 2,424,585 dated July 29, 1947, and is adapted to compare two sources of alternating current which are connected respectively to the primary windings of transformers $T_1$ and $T_2$. When two identical sources are simultaneously connected to these transformers then the signaling relay S operates. A number of distinct sources of alternating current are provided for this purpose, e. g. 12 sources of the same frequency and potential whose phase angles differ by multiples of 30°. The different control circuits which work in one group to serve a number of selectors are each connected to a different alternating current source which is designated in the drawing by the symbol $\varphi_x$. It is to be understood that these sources may be used in common for several control circuits, each belonging to a different group.

When relay H operates, the source of current $\varphi_x$, the only one of its kind in each group of control circuits, is connected to the primary winding of transformer $T_2$, via a front contact $h_2$ and resistance $R_3$. This is the reference current in the discriminating device R. The same source of current $\varphi_x$ is connected via a resistance $R_4$, front contact $h_4$ and brush BSa to the common marking multiple which extends over a terminals of all selectors BS and over the d terminals of all selectors CS, one multiple wire being provided for each position of these two switches. The potential $\varphi_x$ is, therefore, connected to that d terminal of all selectors CS which corresponds to the outlet previously engaged by the control circuit under consideration. Contact $h_3$ now connects the test brush CSd of selector CS to the primary winding of transformer $T_1$ of the discriminating device in an obvious circuit via brush CFe, and contact $h_1$ closes an equally obvious circuit for the power magnet CS of this switch via brush CFd to ground at a break contact of relay S. Furthermore, ground is prepared at contact $h_5$ to the winding of relay S whereby the discriminating device will operate this relay whenever the currents in the two transformers are derived from the same source.

The selector CS now moves under the control of relay S until its test brush CSd meets the terminal on which the marking potential $\varphi_x$ is found, whereupon a circuit is closed from $\varphi_x$ through resistance $R_4$, contact $h_4$, brush BSa, common marking multiple, brush CSd, brush CFe, contact $h_3$, primary winding of transformer $T_1$ to ground. Relay S operates and stops finder CS. Over a make contact of relay S and brush CFc, relay C at the incoming junction IL is operated and locks up on its contact $c_5$ in series with relay D at the outgoing junction OL. By the opening of contact $c_1$ the test potential for the control circuit is disconnected. The relay T releases and the control circuit CC is restored to normal. Relay C closes contacts $c_3$ and $c_4$ and extends the talking conductors, and at contact $c_2$ disconnects the stepping relay P. Relay D at the outgoing junction opens the test potential at its break contact $d_2$, and at a contact $d_1$ closes a circuit indicating the seizure of this junction in a similar manner as was indicated by the closure of contact $e_1$ at the incoming junction.

It will be obvious that when the selector switch CS is hunting, it may meet marking wires on which marking potentials supplied from other control circuits are present. When such marking potentials are applied to transformer $T_1$ they will not cause the functioning of relay S, because they are taken from sources having different characteristics from those of the source used for the particular control circuit to which the selector is connected. It is therefore impossible that selector CS be stopped on an outlet which is marked by a different control circuit. Furthermore, "crossed" connections are not possible, even when two selectors CS encounter simultaneously the marking potentials applied from control circuits to which they are not connected.

Figure 5:
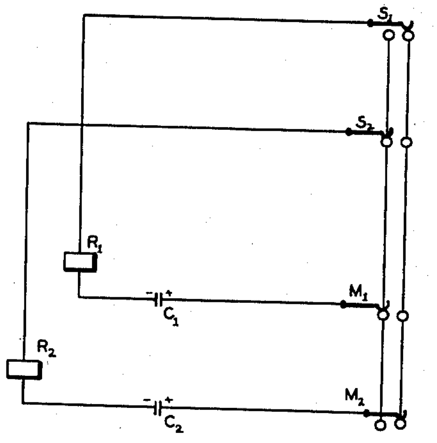
Fig. 5 shows the possibility of obtaining "crossed" connections in known systems of marking over a common marking multiple, based on the use of individual sources of current.
Figure 6:
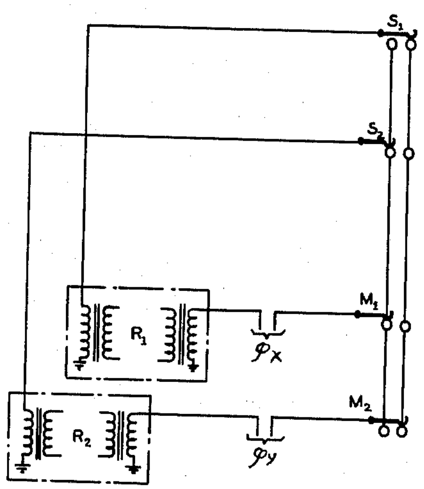
Fig. 6 demonstrates the impossibility of "crossed" connections with the arrangement according to the invention.

This is made clear by Figs. 5 and 6 which show the test brushes of two selectors $S_1$ and $S_2$ and the marking brushes $M_1$ and $M_2$ of the control circuits by which each selector is served. It is assumed that selector $S_1$ is served by marker $M_1$ and selector $S_2$ by marker $M_2$. The selectors and markers have been shown in positions on a common marking multiple, selector $S_1$ standing in the position marked by marker $M_2$ and vice versa.

The scheme shown in Fig. 5 is that of the previously mentioned Swiss Patent No. 198,279 with close circuits through both charged condensers $C_1$ and $C_2$ and the two test relays $R_1$ and $R_2$ in series as follows:

From the positive plate at condenser $C_1$, via brush $M_1$ marking multiple, brush $S_2$, test relays $R_2$, negative plate of condenser $C_2$, positive plate of this condenser, brush $M_2$, marking multiple, brush $S_1$, test relay $R_1$ to negative plate of condenser $C_1$. It will be seen that the charges of the two condensers are in series and will therefore aid one another to operate both test relays which work with their normal operating current.

A study of Fig. 6, which represents the arrangement according to this invention, shows that a similar series circuit via two loops of marking multiples is not possible because, unlike the arrangement of Fig. 5, the discriminating device $R_1$ or $R_2$ does not depend upon the completion of a closed loop. According to Fig. 6 the source $\varphi_x$ which is connected as reference to discriminating device $R_1$, is connected also through the marking multiple to signal the discriminating device $R_2$ and, inversely, the source $\varphi_y$ which is connected as reference to discriminating device $R_2$, is connected to signal discriminating device $R_1$. Neither discriminating device will function, because the two sources have different characteristics.

Figure 2:
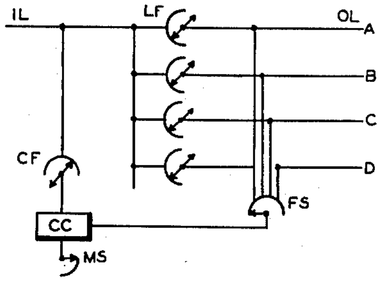

Fig. 2 represents part of a toll office comprising a number of incoming lines IL and outgoing lines OL, which are divided in four different directions: A, B, C and D. Each of the lines OL has a backward hunting finder LF, only one per direction being shown. The incoming lines IL are multipled over the terminal banks of all finders LF.

When a call appears on an incoming line IL, a free one of a group of control circuits is selected by means of a finder CF. The desired digit is then transmitted to a marker switch MS in the selected control circuit. A selector switch FS associated with each control circuit is controlled by the marker switch to find a free outgoing line in the wanted direction.

As in the case of the selector BS of Fig. 1, the selector FS of Fig. 3 may be of any known type. In the embodiment of the invention according to Fig. 4, FS is a single-motion selector set under the control of a marker MS by means of discriminating signals, in the manner disclosed in U. S. application, Serial No. 473,278, now Patent No. 2,452,578 issued November 2, 1948. When a free line OL is found, its finder LF is set under the control of the selected control circuit CC on the terminals of the incoming line IL to which this control circuit is connected.

Since several control circuits are provided in common for a group of lines IL, several finders LF, each controlled by one of these control circuits, may be simultaneously hunting for a calling incoming line IL. These finders LF may belong to the same or to several directions, and if say direction A is desired then no finder for any of the other directions which may be hunting must pick up the calling line. This is insured by the fact that each hunting line finder LF will search only for the particular marking potential on its terminals which is individual to the control circuits in the calling group, viz. the control circuit CC to which it is connected.

Figure 4:
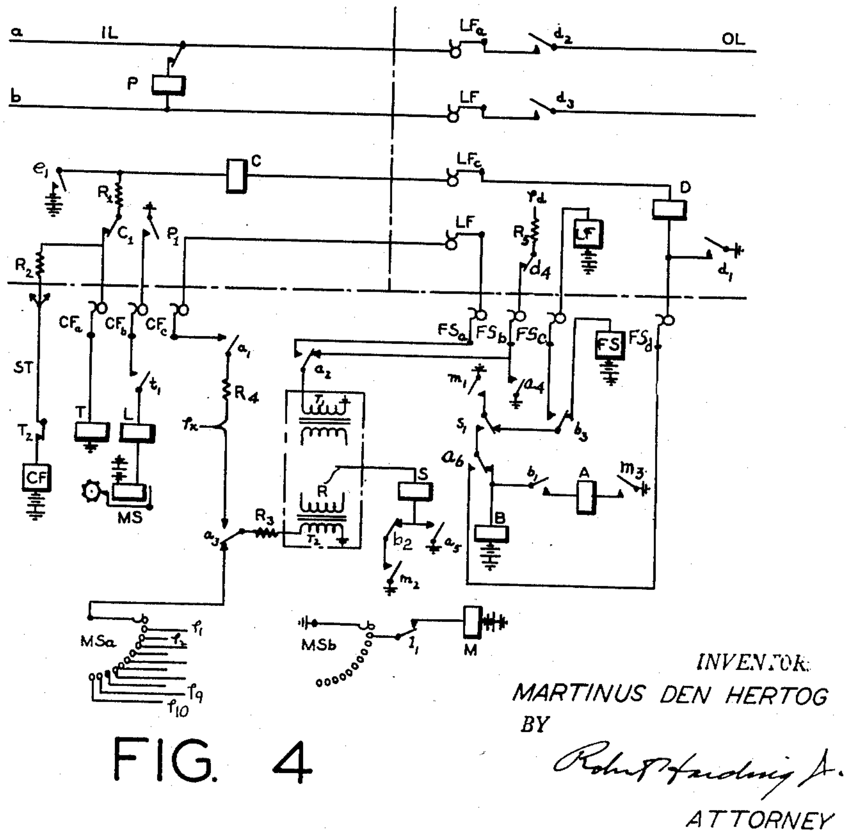

Fig. 4 which shows a simplified circuit diagram of the arrangement according to Fig. 2 works as follows:

A call arriving on an incoming line IL applies battery over a contact $e_1$ to start a group of finders CF by energizing a starting circuit St via resistances $R_1$ and $R_2$. When a free finder CF picks up the calling incoming line, a relay T operates, stops the finder CF and starts the functioning of the control circuit connected with the finder.

The selective impulses are received on the *a* and *b* wires of the line and act on a pulsing relay P which, by a make contact $p_1$ via brush CF*b* and make contact $t_1$, energizes the slow releasing relay L and marker switch MS. The switch MS makes a step for each impulse received and relay L remains energized during a train of impulses. When the train of impulses is over, L falls off and closes on its contact $l_1$ a circuit via the off-normal contacts of arc *b* of marker MS a circuit to operate relay M. At this moment the selector FS starts to hunt for a free outgoing line OL in the wanted group or direction, which is indicated by the position of the marker switch MS. In the shown embodiment a discriminating device R is connected via brush *a* of the marker switch MS to a source of alternating reference current over break contact $a_3$, resistance $R_3$ and the primary winding of transformer $T_2$ to ground. The circuit for the power magnet for the selector FS is closed at contact $m_1$ from ground through break contacts $s_1$ and $b_3$. The test brush FS*b* wipes over terminals individual to each of the outgoing lines and to which a characteristic source of alternating current is connected for each direction. This source of alternating current is represented on the drawing by the symbol $\varphi_d$. When FS reaches a terminal to which the same potential as that from the reference source is connected, then the discriminating device R operates.

Unessential details of the circuit have been omitted, and it is assumed that the operation of the relay S by the discriminating device causes the testing and selection of the outgoing lines in the normal manner until a relay B operates which disables the discriminating device by opening the ground to relay S. The operation of relay B has been represented on the drawing by the following circuit closed over a make contact of relay S: Ground at make contact $m_1$, make contact $s_1$, break contact $a_6$, winding of B to battery. B opens the circuit for S and prepares a locking circuit for itself, via its contact $b_1$, through the winding of A to ground at contact $m_3$. Contact $b_2$ disables the discriminating device, causing S to release owing to which relay A can operate in series with B. Relay A starts the finder LF and prepares all circuits necessary to set this finder on the terminals corresponding to the incoming line to which the control circuit is connected.

First place relay A connects at make contact $a_3$ the source of reference current $\varphi_x$ to transformer $T_2$ of the discriminating device. As already explained above this source $\varphi_x$ is used only for one control in each group, and each control circuit in the group has a different source.

The same source $\varphi_x$ is connected via resistance $R_4$, contact $a_1$ and brush CF*c* to the test multiple of the finder LF when on the incoming line IL to which the control circuit CC is connected.

Transformer $T_1$ of the discriminating device is connected by contact $a_2$ and brush FS$a$ to the test brush LF$d$ of the line finder LF associated with the outgoing line circuit selected by the control circuit. The power magnet LF of this line finder will be energized from ground at make contact $m_1$ via break contact $s_1$, make contact $b_3$, brush FS$c$. LF hunts until its test brush LF$d$ finds the marking potential placed on the test terminal of the incoming line by the control circuit to which it is attached, at which time the sources connected to $T_1$ and $T_2$ will be the same, whereupon S operates a second time, but now over the make contact $a_5$.

Relays S causes the operation of relays C in the incoming and D in the outgoing line in a series circuit from ground at make contact $m_1$, make contacts $s_1$ and $a_6$, brush FS$d$, winding of relay D, brush LF$c$, winding of relay C to battery at $e_1$. D operates and locks itself independently of the ground supplied from the control circuit, connects through the talking conductors at contacts $d_2$ and $d_3$ and disconnects the test potential $\varphi_d$ at a break contact $d_4$. This potential was previously kept busy from the control circuit by the ground on make contact $a_4$.

Relay C in the incoming line opens the circuit for relay T in the control circuit which restores to normal and disconnects itself from the incoming and outgoing lines.

It will be seen that the principle of marking is the same as in Fig. 3 whereby "crossed" connections will not be possible. Backward hunting finders of several groups may thus be controlled via a common test multiple in such a manner, that only a finder of a predetermined group can engage a calling line.

Obviously, it is not necessary to employ the common control circuits shown in Figs. 2 and 4, and each of the incoming lines IL of Fig. 2 may be provided with a marker switch on which the called digit is received. One contact brush of this marker may be used to connect one of a number of different A. C. sources, each corresponding to a different direction or trunk group, to marking wires which are multipled straight over all the groups of line finders LF. Each outgoing line OL may be provided with an individual discriminating device for which a reference current is obtained from that A. C. source which is characteristic for its direction.

Thus, any one of the different A. C. sources may be connected as a marking potential to a marking wire, and only those finders whose discriminating device is connected to the corresponding source of reference current can hunt for this marking potential. Finders of different directions which may be hunting cannot seize the calling incoming line.

The selectors BS of Fig. 1, or FS of Fig. 3 may be independent of and differing in number from the control circuits CC. The circuits CC will in this case have also other duties, so that their holding time will be much longer than is needed for setting the selector CS of Fig. 1 or the line finder LF of Fig. 3. For example, the circuits CC may be register controllers, which must control the completion of the connection, in which case it would be economically justified to provide a separate small group of marking multiple selectors (BS or FS) which are accessible to the much larger group of registers via some kind of access equipment. The discriminating device may be located either at the register controllers (preferably when it can be used for other purposes at these circuits) or at the marking multiple selectors. In both cases, however, it is preferable to allot the different sources of marking A. C., not individually to each register controller, but to each marking multiple selector in a group provided in common for a number of selectors CS (Fig. 1) or finders LF (Fig. 3). This will reduce the number of A. C. sources to a minimum, the marking multiple selectors being least in number. The register controllers may be larger in number than the marking multiple selectors, because they may be provided in common for the whole exchange equipment, whereas the marking multiple selectors may be divided into several groups. It should be remembered that a different A. C. source is required only for each circuit in a group. In case the discriminating devices are provided in the register controllers, the connection to a marking A. C. source in the common marking multiple and for connection to the discriminating device as a source of reference current is obtained at the register controller through any of the marking multiple selectors which happens to be engaged by it. Two or more registers may use simultaneously the same source connected to marking multiple selectors of different groups. No wrong operation may result because in each group of lines only as many selectors or finders may hunt at a time as there are marking multiple selectors, and each of these must use a different A. C. source.

What I claim is:

1. In a telecommunication system, a plurality of incoming lines, a plurality of outgoing lines, a group of first switches for connecting any incoming line with any desired outgoing line, said switches being normally inactive and each having electromagnetic operating means, a plurality of control circuits, including second switches, one being operative upon the initiation of a call on an incoming line for connecting an idle control circuit to the line, a third switch in each control circuit, means for operating the third switch of the selected control circuit for selecting the desired outgoing line, an actuating circuit closed thereupon over the operated second switch for the operating means of a first switch, a plurality of sources having different electrical characteristics, a discriminator in the control circuit taken into use, a first connection from a source to the discriminator established upon the selection of an outgoing line by the third switch, a second connection to said discriminator from a terminal of said first switch through one of the other switches, a connection through the other of said other switches from a source to a terminal of said first switch having contacting cooperation with said first-mentioned terminal, and a relay controlling the actuating circuit of the first switch operated only when the electrical characteristics delivered by the first and second connections to the discriminator bear a predetermined relationship to one-another.

2. The system according to claim 1, and in which each source is connected to a different control circuit and the first connection to the discriminator is from the source connected with the particular control circuit.

3. The system according to claim 1, and in which the control circuits are provided in a plurality of groups, each source being connected to a certain control circuit in each group and the first connection to the discriminator is from the source connected with the particular control circuit.

4. The system according to claim 1, and in which the relay is operated only when the electrical characteristics delivered to said first and second connections are the same.

5. The system according to claim 1, and in which the first switches are selectors, each having a set of wipers connected with an incoming line, and a terminal bank connected in multiple to all the outgoing lines and the terminals of the third switch.

6. The system according to claim 1, and in which the first switches are finders, each having a set of wipers for connection to an outgoing line and multipled to terminals of the third switches, and a terminal bank multipled to all the incoming lines.

7. The system according to claim 1, and in which each third switch has a set of wipers connected with a control circuit included in the operating means, and a terminal bank multipled to all the outgoing lines.

8. The system according to claim 1, and means controlled over a calling incoming line for operating the third switch of the selected control circuit in accordance with a numerical designation of the desired outgoing line.

9. The system according to claim 1, and in which the outgoing lines are arranged in groups, means for operating the third switch of the selected control circuit for selecting a group of outgoing lines, and for hunting for an idle line in the selected group.

10. The system according to claim 1, and in which each second switch has a set of wipers connected with the control circuit connected to the line, and a bank of terminals multipled to all the incoming lines.

11. The system according to claim 1, and in which said sources are sources of alternating current differing from one-another by a predetermined phase angle.

12. In a telecommunication system, a plurality of incoming lines, a plurality of groups of outgoing lines, a group of first switches for connecting any incoming line with any desired outgoing line, said switches being normally inactive and each having electro-magnetic operating means, a plurality of control circuits including second switches, one of said second switches being operative upon the initiation of a call on an incoming line for connecting a control circuit to the incoming line, a third switch associated with each control circuit, said switches having sets of terminals and wipers cooperating therewith, means for operating the third switch of the selected control circuit for selecting an idle outgoing line in the desired group, an actuating circuit closed thereupon over a wiper and a terminal of the operated second switch for the operating means of a first switch, a plurality of sources having different electrical characteristics, each connected with a different connecting circuit, a discriminator in each control circuit, means in the selected control circuit for connecting the connected source to the discriminator upon the selection of an outgoing line by the third switch, a circuit for connecting the last-mentioned source with the discriminator over a wiper and a terminal of the second, the third and the first switches, and a relay controlling the actuating circuit of the first switch operated only when the two connections from the last-mentioned source to the discriminator exist at the same time.

MARTINUS DEN HERTOG.

REFERENCES CITED

The following references are of record in the file of this patent:

UNITED STATES PATENTS

| Number | Name | Date |
|---|---|---|
| 1,900,969 | Wright | Mar. 14, 1933 |
| 2,070,909 | Lubberger | Feb. 16, 1937 |
| 2,106,897 | Mercer | Feb. 1, 1938 |
| 2,172,947 | Taylor | Sept. 12, 1939 |
| 2,424,585 | Simon | July 29, 1947 |